United States Patent [19]

Kurihara

[11] Patent Number: 5,895,703

[45] Date of Patent: Apr. 20, 1999

[54] DECORATIVE BEADS AND METHOD FOR MAKING DECORATIVE BEADS

[76] Inventor: Akira Kurihara, 5718 Ravenspur Dr., #101, Rancho Palos Verdes, Calif. 90274

[21] Appl. No.: 08/817,607

[22] PCT Filed: Oct. 25, 1995

[86] PCT No.: PCT/JP95/02188

§ 371 Date: Aug. 14, 1997

§ 102(e) Date: Aug. 14, 1997

[87] PCT Pub. No.: WO96/13629

PCT Pub. Date: May 9, 1996

[30] Foreign Application Priority Data

Oct. 26, 1994 [JP] Japan ................................. 6-262231

[51] Int. Cl.$^6$ ..................... B32B 1/08; B32B 31/26; D04D 9/06

[52] U.S. Cl. ......................... 428/188; 156/85; 156/222; 156/250; 156/268; 264/230; 264/342 R; 264/DIG. 71; 428/542.2; 428/542.8

[58] Field of Search ..................... 156/84, 85, 222, 156/268, 250; 264/230, 242 R, DIG. 71; 428/188, 411.1, 542.2, 542.6, 542.8

[56] References Cited

U.S. PATENT DOCUMENTS 3,433,688  3/1969  Staats et al. ........................... 156/85

FOREIGN PATENT DOCUMENTS 5-321122  12/1993  Japan.

Primary Examiner—Richard Crispino
Attorney, Agent, or Firm—Finnegan, Henderson, Farabow, Garrett & Dunner, L.L.P.

[57] ABSTRACT

Beads capable of stably executing bead embroidery having high quality by using a continuous form of beads which can accomplish automatic bead embroidery. The beads comprise a laminate film 1a formed by laminating films 2 and 3 having different thermal shrinkage ratios in a predetermined direction. The laminate film 1a is heat-treated and curled into a cylindrical shape to form a cylinder 1b, and cuts 4 are formed into the cylinder 1b at predetermined intervals so as to form the continuous member 1c of the beads 6.

2 Claims, 1 Drawing Sheet

DECORATIVE BEADS AND METHOD FOR MAKING DECORATIVE BEADS

This application is a 35 U.S.C. 371 application of PCT/JP95/02188 filed Oct. 25, 1995.

TECHNICAL FIELD

The present invention relates to decorative beads which are sewn to a cloth or the like along with embroideries.

BACKGROUND ART

By the present applicant, a useful method and an apparatus for embroidering beads are already developed and disclosed in a patent publication (Japanese Patent Application Publication No.5-321122). According to the published known art, by using a stringlike continuous member comprising multiple numbers of cylindrical beads connected in the axial direction, bead embroidery of high quality can be stably performed. The continuous member of beads used in the above mentioned art can be made in various forms by various kinds of method. It is possible to obtain remarkable effects from the beads embroidering methods of the published known art by applying any form of the continuous member of beads to the embroidering method.

However, the applicant intends to innovate the continuous member of beads applicable to the beads embroidering method and apparatus disclosed in the above mentioned publication so as to further efficiently perform the method and apparatus of known art.

Therefore, it is an object of the present invention to provide beads capable of stably executing bead embroidery having high quality by using a continuous form of beads which can accomplish automatic bead embroidery.

DISCLOSURE OF INVENTION

In order to achieve the object, the present invention provides beads that comprise a laminate film formed by laminating films having different thermal shrinkage ratios in a predetermined direction, the laminate film being heat-treated and curled into a cylindrical shape to form beads.

According to a preferred embodiment of the present invention, the beads are formed in a shape of continuous member comprising a plurality of cylindrical beads divided continuously in the axial direction by forming cuts into a cylinder in the radial direction with a portion of the cylinder left intact as a connecting section between successive beads.

The present invention further provides a method for producing a continuous member of beads wherein a longitudinal laminate tape formed by laminating films having different thermal shrinkage ratios in the lateral direction of the tape is heat-treated and curled in the lateral direction so as to form longitudinally continuous elongate cylinder and wherein cuts are formed into the cylinder at predetermined intervals with a portion of the cylinder left intact as a connecting section between successive beads so as to form a continuous member comprising a plurality of cylindrical beads continuous in the axial direction.

The laminate film is constituted for example from a laminate tape formed by laminating films having different thermal shrinkage ratios in the lateral direction. When the laminate tape is heated, the tape is curled in the lateral direction due to the difference between the thermal shrinkage ratios of the films so that a cylinder is formed from the tape. After that, cuts are formed into the cylinder at predetermined intervals so as to form a continuous member of the cylindrical beads. Even if the curled beads are further heated afterwards, the beads are not uncurled to open, therefore the cylindrical shape is stably maintained.

BEST MODE FOR CARRYING OUT THE INVENTION

Figure 1:
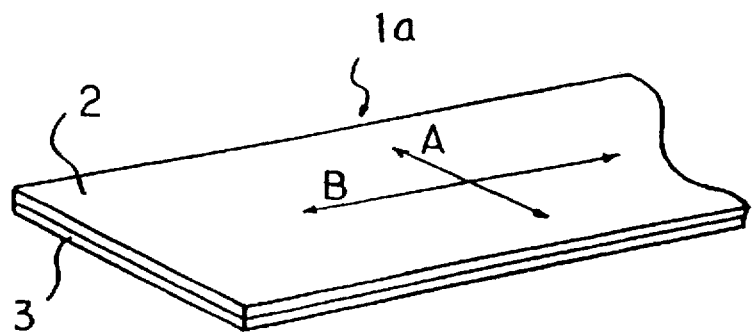
FIG. 1 is a perspective view of a laminate tape for forming the beads in accordance with the present invention.

FIG. 1 is a perspective view of a laminate tape for forming the beads of the present invention. This laminate tape 1a is formed by laminating a first film 2 and a second film 3 made from for example polyester and having different thermal shrinkage ratios in the lateral direction (arrow A) of the tape. The thermal shrinkage ratio of the first film 2 is adjusted to be larger than that of the second film 3. Or the thermal expansion ratio of the second film 3 is adjusted to be larger than that of the first film 2. In either of cases, it is desirable that the shrinkage ratios of the films in the longitudinal direction (arrow B) of the tape be the same.

Figure 2:
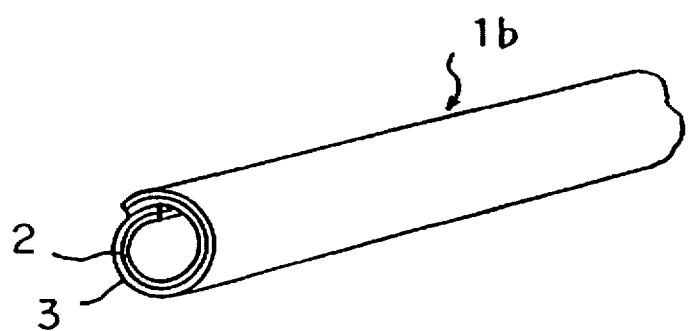
FIG. 2 is a perspective view of a cylinder formed by heating the tape of FIG. 1.

By heating the laminate tape 1a with the use of an electric heater or other appropriate heat treatment means, the tape is curled in the lateral direction, as shown in FIG. 2, due to the difference between the thermal shrinkage ratios of the films 2 and 3, so that a continuous form of an elongate cylinder 1b is obtained. When the shape of the cylinder is stabilized, the heat treatment is stopped to harden the cylinder.

After that, cuts 4 are formed by a cutter (not shown) at predetermined intervals into the cylinder 1b with a connecting section 5 left intact between successive beads at a portion of cylinder in the radial direction of each cut section. In that way, a continuous member 1c of beads comprising multiple numbers of beads 6 connected in the axial direction is formed. The continuous member 1c of beads is set in an apparatus which is itself a known type of apparatus wherein each bead is automatically separated and sewed to a cloth.

Figure 3:
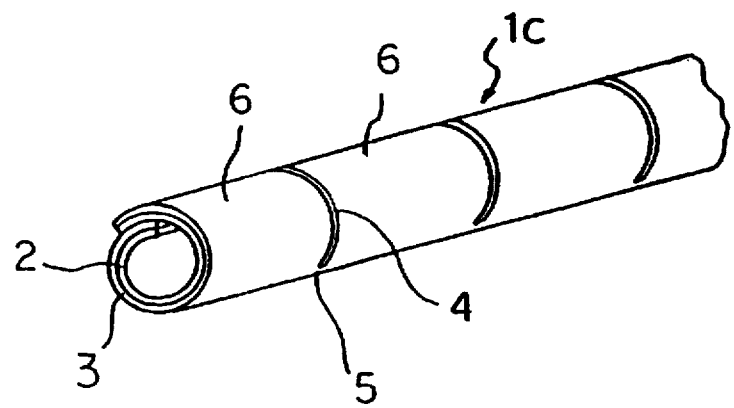
FIG. 3 is a perspective view of a continuous member of beads made by forming cuts into the cylinder of FIG. 2.

When executing bead embroidery, the laminate tape 1a of FIG. 1 is wound in a roll shape first. The tape roll is unwound and the tape is passed through a heating means so as to form the cylinder of FIG. 2. After that, the cylinder is successively passed through a cutter means so as to form the continuous member 1c of beads of FIG. 3. The continuous member 1c of beads is then successively set in a bead embroidery apparatus. In that way, a series of bead embroidering process can be automated.

Note that although the laminate tape of the above mentioned embodiment has a two-layer structure, it is possible to use a laminate structure having three layers or more in order to enhance the ornamental effect by thickening the beads or applying different colors to the layers. It is also possible to use various type films such as heat expansive type films, heat contractive type films or combination of the films of both types as the films of the laminate tape to form the cylinder by curling the laminate tape through heat-treatment.

As mentioned above, in accordance with the present invention, it becomes possible to easily form cylindrical beads with the use of simple means and efficiently automate the bead embroidery process. Also, if heat is applied again to the beads after formed, thermal stress functions to further curl the cylinder rather than uncurling and opening the cylindrical shape, thereby the cylindrical shape is stably maintained.

INDUSTRIAL APPLICABILITY

In the industrial field of bead embroidery technology, beads can be easily formed with the use of simple means and the embroidery process can be efficiently automated as well as the bead shape can be stably maintained which makes it possible to upgrade the quality of bead products.

I claim:

1. A continuous strand of decorative beads in which a plurality of beads are connected in series, each strand comprising:

an axially elongated, generally cylindrical coil formed by laminating at least two layers of films having different thermal shrinkage ratios in a predetermined direction and by applying heat treatment to curl said at least two layers of films creating said cylindrical coil having a circumferential overlap portion, the plurality of beads being defined by separated axial segments of said coil, said axial segments being separated after said heat treatment is applied to said films; and a connection section connecting said axial segments of said axially elongated, generally cylindrical coil at a common short circumferential portion of the coil to provide the continuous strand of beads;

each of said axial segments having a first length in an axial direction and said connection section having a second length in the axial direction being substantially smaller than said first length.

2. A method for producing a continuous strand of decorative beads, comprising the steps of:

forming a laminate tape by laminating at least two layers of films having different thermal shrinkage ratios in a predetermined direction;

heat treating to curl said laminate tape and to form an axially elongate cylinder having a circumferential overlap portion;

forming a plurality of lateral cuts into said elongate cylinder at predetermined intervals to form a plurality of beads after said laminate tape is curled; and forming a corresponding plurality of connection sections at a common short circumferential portion of said axially elongate cylinder constructing said continuous strand of beads, each bead connected to a successive bead by said connection section along said common short circumferential portion of said elongate cylinder;

each of said beads having a first length in an axial direction of said axially elongate coil and each of said plurality of cuts having a second length in the axial direction, the second length being substantially smaller than said first length.

* * * * *